US006125150A

United States Patent [19]

Wesel et al.

[11] Patent Number: 6,125,150
[45] Date of Patent: Sep. 26, 2000

[54] TRANSMISSION SYSTEM USING CODE DESIGNED FOR TRANSMISSION WITH PERIODIC INTERLEAVING

[75] Inventors: Richard Dale Wesel, Palo Alto; John M. Cioffi, Cupertino, both of Calif.

[73] Assignee: The Board of Trustees of the Leland Stanford, Junior University, Stanford, Calif.

[21] Appl. No.: 08/550,443

[22] Filed: Oct. 30, 1995

[51] Int. Cl.[7] .............................. H04L 5/12; H04L 27/26
[52] U.S. Cl. .......................... 375/265; 375/298; 714/786
[58] Field of Search ................................... 375/298, 261, 375/265; 714/786, 790, 791, 792, 794

[56] References Cited

U.S. PATENT DOCUMENTS

| | | | |
|---|---|---|---|
| 4,945,549 | 7/1990 | Simon et al. | 357/280 |
| 5,214,656 | 5/1993 | Chung et al. | 371/43 |
| 5,289,501 | 2/1994 | Seshadri et al. | 375/286 |
| 5,301,209 | 4/1994 | Wei | 375/261 |
| 5,363,408 | 11/1994 | Paik et al. | 375/261 |
| 5,559,561 | 9/1996 | Wei | 348/470 |

OTHER PUBLICATIONS

Leung, Yiuman S., Wilson, Stephen G., Ketchum, John W., "*Multifrequency Trellis Coding with Low Delay for Fading Channels*,", IEEE Transactions on Communications, vol. 41, No. 10, Oct. 1999.

*Primary Examiner*—Young T. Tse
*Attorney, Agent, or Firm*—Claude A. S. Hamrick; Oppenheimer Wolff & Donnelly; Emil Cheng

[57] ABSTRACT

The present invention discloses an OFDM transmission system providing a high level of performance on a variety of frequency selective channels by using a code having the characteristics of maximum PPD and maximum PECL, and a constellation having size $2^n$ where n generally is greater than k+1, where k is the number of bits in each symbol input to the convolutional encoder. The codes are designed to allow high SNR subchannels to carry their full potential of information which is then used to compensate for information lost on low SNR subchannels.

30 Claims, 5 Drawing Sheets

| CODE # | PECL | $\log_2(P\,P\,D(7))$ | $\log_2(P\,P\,D(8))$ | $\log_2(P\,P\,D(7))+\log_2(P\,P\,D(8))$ |
|---|---|---|---|---|
| 1 | 7 | 11.068 | 10.461 | 21.53 |
| 2 | 7 | 9.769 | 11.764 | 21.53 |
| 3 | 7 | 9.939 | 11.501 | 21.44 |
| 4 | 7 | 9.876 | 11.447 | 21.32 |
| 5 | 7 | 10.671 | 10.617 | 21.29 |

Fig. 8

TRANSMISSION SYSTEM USING CODE DESIGNED FOR TRANSMISSION WITH PERIODIC INTERLEAVING

BACKGROUND OF THE INVENTION

1. Field of the Invention

The present invention generally relates to the area of data communication, and more particularly to a transmission system using a code designed to provide reliable broadcast information to multiple receivers over different channels.

2. Brief Description of the Prior Art

In a data communication system where the transmitter cannot be specialized to the impulse response of any particular channel or the transmitter does not have a reliable feedback link over which to learn the signal characteristics of the channels, system performance or capacity may be severely impaired. An example of such a situation where the transmitter cannot be specialized to the channels is when information is broadcasted to multiple users over different channels such as with digital audio broadcast system (DAB) or High Definition Television System (HDTV).

In these cases, in order to obtain good performance, orthogonal frequency division multiplexing (OFDM) is used.

Orthogonal frequency division multiplexing is a form of multicarrier modulation and is an alternative to equalized single carrier modulation. Multicarrier modulation is especially attractive in environments where severe intersymbol interference (ISI) makes equalization difficult. Terrestrial wireless broadcast from multiple towers is an example of a severe ISI environment where multicarrier modulation is attractive. Hikmet Sari, Georges Karam, and Isabelle Jeanclaude, *Transmission Techniques for Digital Terrestrial TV Broadcasting, IEEE Communications Magazine*, 33(2) :100–109, February 1995.

Figure 1:
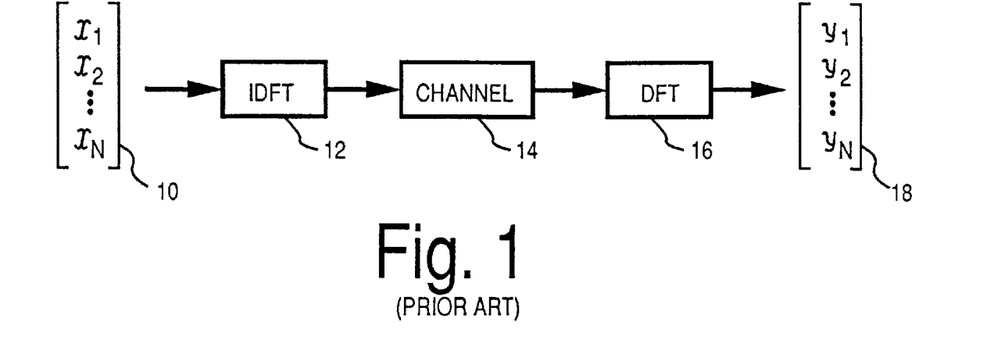
FIG. 1 is a block diagram of a common transmission modulation system.

A well known form of multicarrier modulation which uses discrete Fourier transformation (DFT) is shown in FIG. 1. Signal values $x_k$ 10, which are produced by a coded modulation scheme, are processed by inverse discrete Fourier transformation (IDFT) 12 and transmitted through a transmission medium (or channel) 14. The information is then received and processed by discrete Fourier transformation (DFT) 16 to produce the received signal points $y_k$ 18 which are then processed by a decoder. When bits and power are distributed evenly across the subcarriers by the transmitter, such a method is referred to as orthogonal frequency division multiplexing (OFDM).

Figure 2:
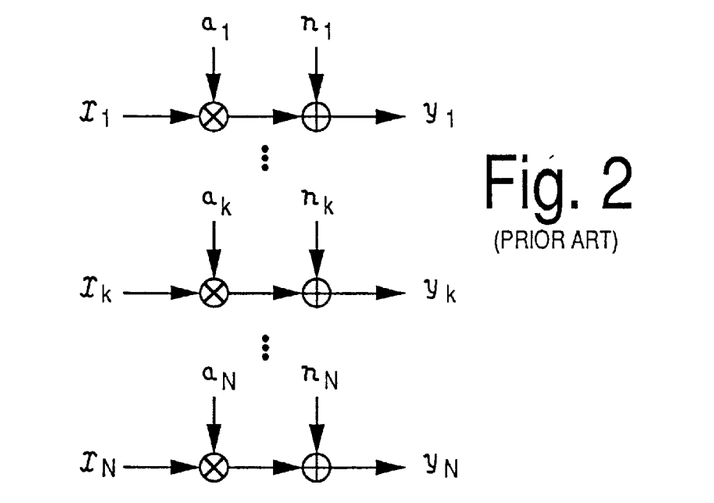
FIG. 2 illustrates scaling of input data by subchannel gain and noise.

The motivation for using OFDM is illustrated in FIG. 2. A single additive white Gaussian noise (AWGN) channel with intersymbol interference (ISI) is converted to a number of parallel AWGN sub-channels that have no ISI, k=1 . . . N. Each sub-channel consists only of a scale factor, $a_k$, and AWGN, $n_k$. The complex scale factors, $a_k$, are exactly the values of the DFT of the channel impulse response. For an AWGN channel with ISI, the noise has a flat spectrum so that $E[n_k^2]=E[n^2]$ for all k. A cyclic prefix (guard interval) approximately the length of the channel impulse response is inserted between each DFT block in order for the transformation to parallel channels to be exact.

Note that the equalization problem has not been solved by the use of multiple carriers. Rather, the equalization problem has been transformed to a problem of coding over parallel channels with unequal signal-to-noise ratios (SNRs). When the SNR of each subcarrier is known, the coding problem can be resolved by placing an appropriate number of bits on each subcarrier. However, in a broadcast situation or in a system without feedback from the receiver, the subcarriers' SNRs are not known. In this type of situation, coding and interleaving must allow the high SNR subcarriers to compensate for the low SNR subcarriers regardless of which subcarriers have high or low SNR.

To achieve the highest possible performance, a system's performance should be compared with the best performance obtainable as predicted by the relevant theory. For example, the performance for a given code on a transmission system on AWGN channels is typically quantified by the difference between the required SNR for a given code to achieve a desired error rate and the required SNR of an ideal code from information theory for error free transmission.

When a given code must operate on a variety of channels with a variety of channel characteristics, performance on each channel should be compared with theoretical performance using a measure that is consistent across the channels. The channel having performance farthest from the theoretical performance limit can then be identified as demonstrating a weakness in the code. A good code would result in approximately the same BER for all the channels having the same capacity.

To effectively evaluate the performance of codes over a variety of channels, let alone design codes that will perform well, the theoretical performance limits need to be established.

For any specified set of transmitter powers $\{E[x_k^2]\}$, the mutual information (MI) of a channel described by FIG. 2 is given by $$MI = \sum_{k=1}^{N} \log_2\left(1 + \frac{a_k^2 E[x_k^2]}{E[n_k^2]}\right) \qquad \text{equ. (1)}$$

The mutual information equals the capacity of the channel if the values of $\{E[x_k^2]\}$ are chosen to have the optimal water-pouring distribution. However, in an OFDM system, such optimal distribution cannot be used because channel characteristic is not known at the transmitter. The term mutual information is used here to describe the maximum amount of information that can be transmitted across the channel given a fixed transmit power spectrum.

Shannon's fundamental coding theorem ensures that for each AWGN channel with ISI there is a code that will reliably transmit at a rate equal to the mutual information corresponding to the chosen input power distribution. More crucial for the broadcast situation is Root and Varaiya's 1968 result shown in their article, *Capacity of Classes of Gaussian Channels* (*Siam Journal of Applied Math* 16(6):1350–1393, November 1968), stating that for any given data rate and fixed transmitter power distribution there exists a "universal" code that will reliably transmit over all channels that have mutual informations at or above the attempted rate.

Such a code is ideal for point-to-point transmission over fading channels or broadcast over a variety of channels. Codes with a practical level of complexity combined with OFDM and periodic interleaving which approximate this universal behavior are disclosed by the present invention. In subsequent paragraphs, metrics are presented to identify the degree to which a code is considered to be "universal". The problem with the transmission systems designed under the prior art is that they do not provide consistent performance over a variety of channels which all have the same capacity given a fixed transmitter power spectrum. Even though consistent performance is possible in theory, a transmission system providing such performance has not been forthcoming. The present invention discloses transmission systems using codes that provide consistent and reliable performance over a wide variety of channels having the same capacity.

Two prior art metrics are introduced here to provide the basis for understanding the novel metrics of the present invention. Divsalar and Simon proposed in their article, *The Design of Trellis Coded for Fading Channels: Performance Criteria* (*IEEE Transactions on Communications*, 36(9) :1004–1012, September 1988), two metrics, effective code length (ECL) and product distance, as important metrics in the design of trellis codes for fading channels. They also analytically demonstrated the value as indicators of code performance on Rician channels. These metrics were discussed by Sundberg and Seshadri in their article, *Coded Modulation for Fading Channels: An Overview* (*European Transactions on Telecommunications*, 4(3):309–323, May- –June 1993), as well as in many other papers. Rate $^{n-1}/_n$ trellis codes have been designed according to these metrics by Du and Vucetic and are published in their articles, J. Du and B. Vucetic, *New M-PSK Trellis Codes for Fading Channels* (*Electronics Letters*, 26(16):1267–1269, August 1990), J. Du and B. Vucetic, *New 16-QAM Trellis Codes for Fading Channels* (*Electronics Letters*, 27(12):1009–1010, June 1991), J. Du, Y. Kamio, H. Sasaoka, and B. Vucetic, *New 32-QAM Trellis Codes for Fading Channels* (*Electronics Letters*, 29(20):1745–1746, September 1993).

The ECL of a code is defined to be the minimum number of symbol errors required for an error event to occur. The product distance is defined as the minimum product of the squared Euclidean distances associated with an error event having a fixed (usually minimum) ECL.

SUMMARY OF THE INVENTION

An objective of the present invention is to provide a transmission system having consistent and reliable performance over a wide variety of channels having the same capacity.

Another objective of the present invention is to provide a transmission system designed to allow high SNR subcarriers to carry information to their full potential which will compensate for information lost on low SNR subcarriers.

The present invention discloses a coded modulation scheme providing a consistently high level of performance on a variety of frequency selective channels or on additive white Gaussian noise channels for which the signal-to-noise ratio varies in time (i.e. experiences fades). This high level of performance is attained by a transmitter employing a rate k/n convolutional code possessing certain characteristics, a signal mapper, and periodic interleaving. A corresponding decoding operation must be performed at the receiver. It is presumed that maximum likelihood decoding will be performed by the receiver using the well known Viterbi algorithm with a weighted soft metric.

The present invention is a transmission system generating blocks of output data for transmission. In the invention, the n of the rate k/n convolutional code is chosen to be large enough that higher capacity subcarriers can be used to their full potential. This generally implies that n must be greater than k+1, where k is the number of bits in the input symbol. Furthermore, the present invention employs a rate k/n convolutional code designed to maximize two novel metrics: periodic effective code length (PECL), and periodic product distance (PPD).

Codes designed using the procedures in the present invention perform well in many environments where frequency selectivity is a dominant impairment. An important practical example is HDTV networks where severe ISI is introduced by multiple towers transmitting the same OFDM signal.

For example, a transmission system of the present invention with a rate ¼ code with 16-QAM modulation designed using novel metrics disclosed herein has a range of performance over three example channels of less than 0.75 dB at BER $3\times10^{-6}$ as compared with a prior art transmission system using a rate ½ code with 4-PSK modulation which has a range of 4 dB. At $3\times10^{-6}$ BER, the new code gained 2.5 dB of equivalent AWGN SNR over the commonly used code on the most severe ISI channel.

An advantage of the present invention is that it provides a transmission system having consistent and reliable performance over a wide variety of channels having the same capacity.

Another advantage of the present invention is that it provides a transmission system designed to allow high SNR subcarriers to carry information to their full potential which compensates for information lost on low SNR subcarriers.

These and other objects and advantages of the present invention will no doubt become apparent to those skilled in the art after having read the following detailed description of the preferred embodiment which is illustrated in the several figures of the drawing.

DESCRIPTION OF THE PREFERRED EMBODIMENT

The present invention discloses an OFDM transmission system providing a high level of performance on a variety of frequency selective channels by using a code having the characteristics of maximum PPD and maximum PECL, and a constellation having size $2_n$ where n generally is greater than k+1, where k is the number of bits in each symbol input to the convolutional encoder. The codes are designed to allow high SNR subchannels to carry their full potential of information which is then used to compensate for information lost on low SNR subchannels. The code can also be applied to flat fading and frequency hopping scenarios. One way to apply the code to a frequency hopping scenario is simply use the code designed with the novel metrics in conjunction with an appropriate hopping pattern. In a flat fading scenario, the code designed using the novel metrics can be used with periodic interleaving done in time rather in frequency.

Coded Modulation

Figure 3:
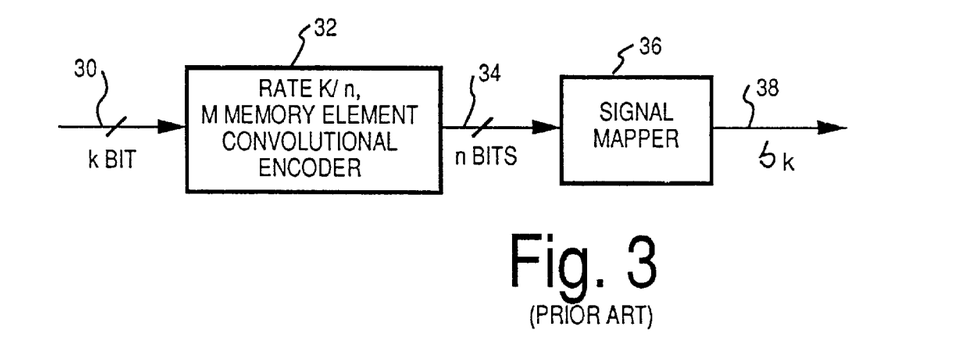
FIG. 3 shows a block diagram of an encoder and a signal mapper.

The combination of a convolutional code and a signal mapper as shown in FIG. 3 is a well known form of coded modulation. A rate k/n convolutional encoder 32 maps sequences of k-bit input symbols 30 to sequences of n-bit output symbols 34. Each n-bit output symbol is affected by the current k-bit input symbol as well as the m most previous k-bit input symbols, m being the number of memory elements in the convolutional encoder. The number of states of the convolutional code is referred to as M, which equals $2^m$. Higher values of M allow better performance but require more complexity.

The n-bit symbols produced by the convolutional encoder are then used by the signal mapper 36 to select one of the $2^n$ possible two dimensional signal points. The set of possible output points is referred to as a constellation. Signal points are often referred to as constellation points.

Suppose that a sequence of t input symbols is used to produce a sequence of t constellation points. Because the mapping is one-to-one, only $2^{kt}$ of the $2^{nt}$ possible output sequences can be produced by any particular convolutional encoder and signal mapper. The choice of which small fraction (i.e. $2^{(k-n)t}$) of output sequences can be produced by the coded modulation scheme has a dramatic effect on the codes ability to provide for reliable transmission.

Figure 4A:
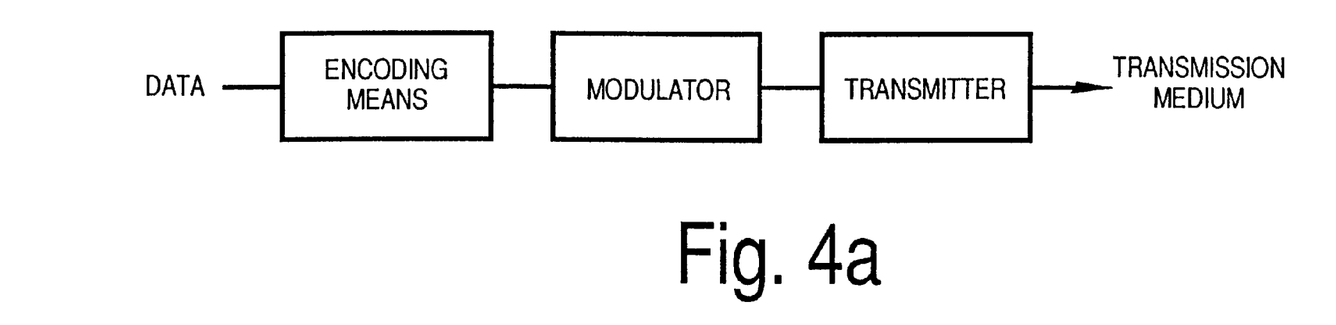
FIG. 4a is a block diagram of a transmission system under the present invention.
Figure 4B:
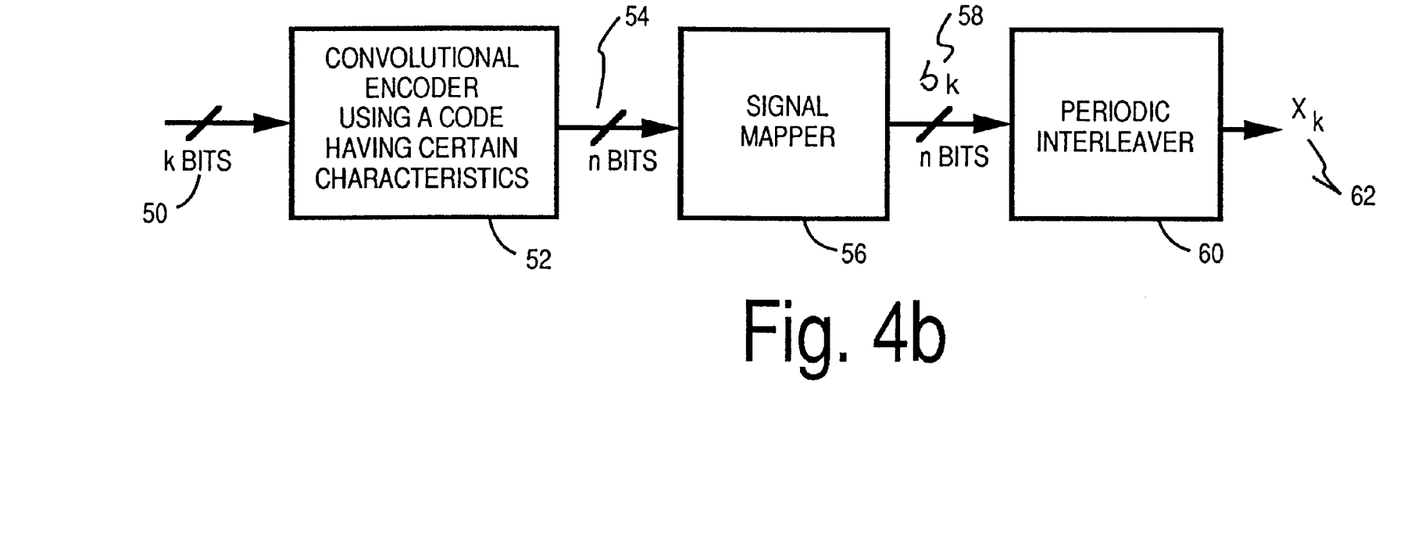
FIG. 4b is a block diagram of the encoder of the transmission system of the present invention.

FIG. 4a illustrates a transmission system of the present invention where the modulator and transmitter are those commonly known in the industry and the novel encoding means is further illustrated by FIG. 4b. Referring to FIG. 4b, a transmission system of the present invention includes a convolutional encoder 52 using a code possessing certain characteristics to generate n-bit symbols 54 from k-bit input symbols 50. Each of the n-bit symbols 54 is mapped to a point in a constellation using a signal mapper 56. The generated symbols, $s_k$ 58, are interleaved by a periodic interleaver 60 to generate interleaved symbols, $x_k$, where $x_k$ is the input data to a transmission system such as one illustrated by FIG. 1.

Codes in the convolutional encoders of the transmission systems of the present invention have the characteristics of maximizing two novel metrics: PPD and PECL. The novel metrics in this invention allow the best codes for broadcast multicarrier transmission with periodic interleaving to be identified.

Periodic Interleaving

Recall that the subchannel gains are the values of the DFT of the channel impulse response. The DFT of a channel changes only gradually with frequency so there will be groups of adjacent subchannel gains that are all small as well as groups of adjacent subchannel gains that are all large. If the m transmitted constellation points which were affected by a particular k-bit input symbol are all transmitted over subchannels with small gains $a_k$, then that k-bit input symbol will most likely be received incorrectly. Thus, if the constellation points are placed on subchannels in the same order that they are produced by the signal mapper, errors will occur almost every time a group of adjacent small subchannel gains is encountered.

A solution to this problem, which is well known in the art, is to interleave the inputs to the subchannels so that subchannels which are used next to each other in the code sequence are at frequencies which are far apart. One interleaving method is call periodic interleaving. Periodic interleaving is illustrated herein and is accomplished by writing the constellation points row by row into a matrix and then reading them out column by column (or vice versa).

Figure 5:
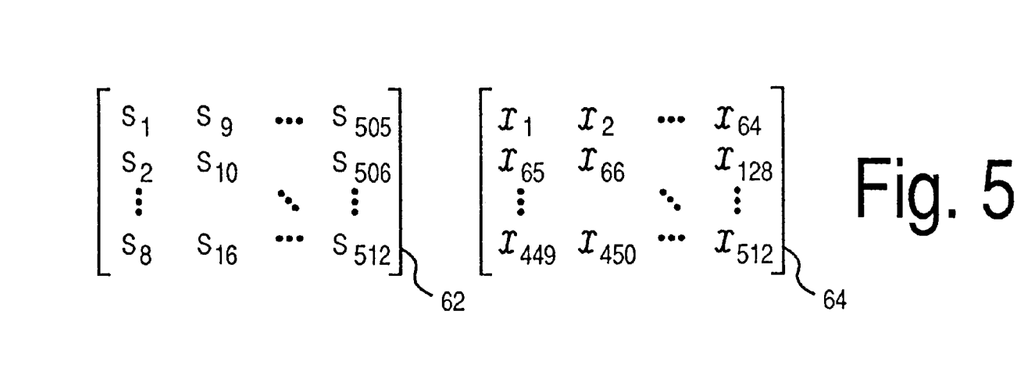
FIG. 5 illustrates interleaving of data before and after the data has been interleaved.

For example, referring to FIG. 5, in a transmission system with 512 subchannels, periodic interleaving with period, P, equals 8 can be accomplished by writing the signal mapper outputs $s_k$ (write labeling) into an 8×64 matrix 62 column by column (from left to right). The interleaved subchannel inputs $x_k$ 64 (read labeling) are then read out row by row (from top to bottom).

Note that exactly the same effect is achieved by placing the interleaving operation between the convolutional encoder and the signal mapper. The matrix writes and reads discussed above are meant to be illustrative. An actual implementation may avoid these operations by writing the values directly to their correct locations in the input vector to the IDFT operation.

Since subchannels far apart will have roughly independent gains, the result of periodic interleaving is that any P constellation points produced sequentially by the signal mapper will be transmitted over P channels with independent subchannel gains. However, two constellation points separated by P points at the output of the signal mapper will be transmitted over subchannels with very similar gains.

Constellation Size

The choice of the constellation size is suggested by the choice of n, the output of the convolutional encoder. (There are $2^n$ constellation points.) Each k-bit input symbol or information symbol) is spread out over m+1 of the n-bit coded symbols. Thus it is not necessarily the case that each subcarrier will be responsible for communicating the same number of information bits even though each subcarrier has n coded bits. In fact, subchannels with larger subchannel gains will be responsible for more information bits than those with smaller subchannel gains. A subchannel with a gain of zero provides no information to the receiver.

It is known from information theory that the maximum number of information bits that the $k^{th}$ subchannel can support is $$\log_2\left(1 + \frac{a_k^2 E[x_k^2]}{\sigma^2}\right) \qquad \text{(equ. 2)}$$

where $a_k$ is the subchannel gain, $E[x_k^2]$ is the average power of the constellation points, and $\sigma^2$ is the variance of the additive white Gaussian noise. To use the set of subchannel gains effectively, the coded modulation scheme should allow those channels with higher capacities to be responsible for more information bits. However, a subchannel cannot provide more information bits than the number of coded bits placed on it.

If the highest subchannel capacity likely to occur is known, then n can be chosen as 1 bit larger than this value. Otherwise, n should be chosen as large as possible, taking into account the limitations of digital to analog and analog to digital converters. Current state of the art systems which set n=2 do not allow the subcarriers with large subchannel gains to be fully utilized.

Code Design Metrics

Figure 6A:
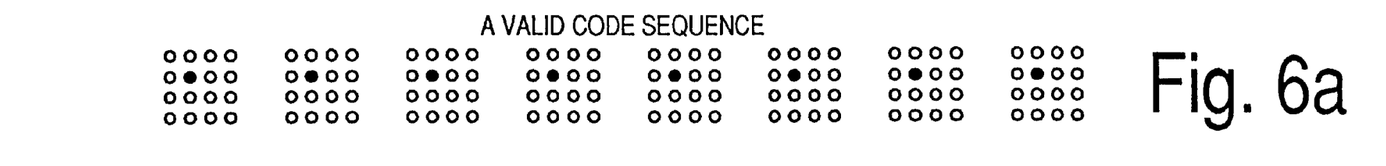
FIGS. 6a–6c illustrate two valid sequences generated from a code and the distance vector for the two sequences.
Figure 6B:
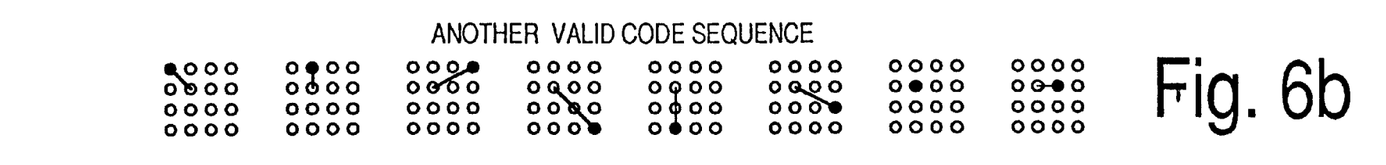
Figure 6C:
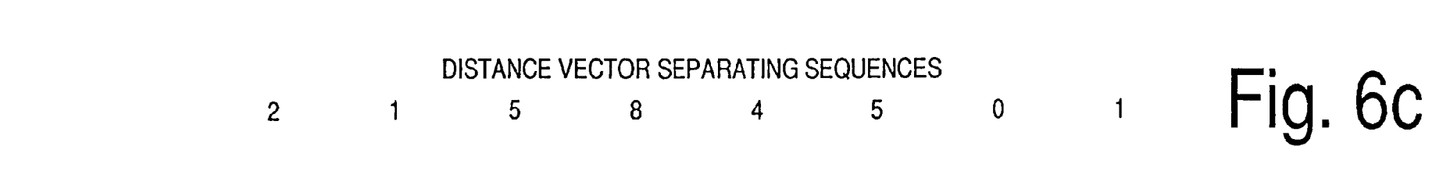

The set of valid sequences that a coded modulation scheme can produce determines the resistance of the received data to errors. Portions of two valid sequences of an example system are shown in FIGS. 6a and 6b. Each of the sequences has eight symbol instants where the top and bottom symbols correspond to each other. Let the top sequence, FIG. 6a, be the output of the transmitter, and the bottom sequence, FIG. 6b, be a valid sequence which might be mistaken for the transmitted sequence at the receiver. The distance vector (also called squared Euclidean distances or simply squared distances) separating the corresponding signal points of the two sequences are illustrated by FIG. 6c.

The second to last constellation points shown are identical for the two sequences and thus have a squared distance of zero. This symbol provides no assistance in distinguishing the two sequences. The fourth symbols in the two sequences are relatively far apart. They have a squared distance of 8 between them (provided that two neighboring points in the horizontal or vertical directions are separated by a distance of 1). This symbol could be useful in distinguishing these two sequences at the receiver if it is transmitted on a subchannel with a relatively large subchannel gain. Thus the distance vector (in this example [2 1 5 8 4 5 0 1]) describes how well two sequences are separated at the output of the signal mapper.

However, the effect of subchannel gains must also be considered. The subchannel gains are effectively scaled by $a_k^2$ to produce the weighted distance vector. For example, consider the distance vector above [2 1 5 8 4 5 0 1], suppose that the eight symbols were transmitted over subchannels with gains $[a_1, \ldots, a_8]$=[1.0 2.0, 0.25, 0.1, 1.0, 2.0, 0.25, 0.1]. The elements of the distance vector are scaled by $a_k^2$ producing the weighted distance vector [2.0, 4.0, 0.31, 0.08, 4.0, 20.0, 0.0, 0.01], and the sum of the weighted distance vector elements is therefore 30.40.

The sum of the weighted distance vector elements, along with the variance of the AWGN, indicates the likelihood that one of the two valid codewords will be mistaken for the other. Specifically, let t be the square root of the sum of the weighted distance vector elements divided by the standard deviation of the AWGN, or $$t = \sqrt{\frac{\sum a_k^2 d_k^2}{\sigma^2}}. \qquad \text{(equ. 3)}$$

Then the probability of error is the area under the tail (from t to infinity) of a normalized Gaussian distribution. The goal of code design for these channels is to keep t as large as possible. This is equivalent to keeping the sum of the weighted distance vector elements as large as possible.

Because periodic interleaving is being employed, the sequence of gains of the subchannels used to transmit the sequence of constellation points can be approximated to be periodic with period P. For example, if an interleaver with period P=4 is employed, the sequence of constellation points transmitted in the above example might be transmitted on subchannels with gains over two periods [1 2 ¼ ¹⁄₁₀; 1 2 ¼ ¹⁄₁₀]. Since the subchannel gains repeat with period P, the sum of the weighted distance vector elements can be computed by first adding all the terms in the distance vector whose indices equal MOD P. There are P of these sums, and the vector of these sums will be referred to as the periodic distance vector. Each of these distance sums in the periodic distance vector is then multiplied by the appropriate subchannel gain to produce the weighted distance vector. The elements of the periodic distance vector will be referred to as $\tilde{d}_k^2$. For example, given a distance vector [2 1 5 8 ; 4 5 0 1] and P is equal to 4, the periodic distance vector is [2+4 1+5 5+0 8+1] or [6 6 5 9]. The sum of the weighted distance vector then can be computed by adding the products of each periodic distance vector element and its corresponding subchannel gains. For example, given periodic distance vector [6 6 5 9] and subchannel gains [1 2 ¼ ¹⁄₁₀], the sum of the weighted distance vector is $(6\times1^2)+(6\times2^2)+(5\times(¼)^2)+(9\times(¹⁄₁₀)^2)$, which equals 30.40.

The subchannel gains are not known at the time the code is being designed. In any case the code must be designed to work for a wide variety of subchannel gains. However, the periodic distance vectors for a given code do not depend on the subchannel gains. Thus, code design efforts are focused on finding a code which has periodic distance vectors for which the sum of the weighted distance vectors remains high for a wide variety of subchannel gains.

If all of the subchannel gains are zero or very small, no periodic distance vector will provide good performance. However, the subchannel gains will be sufficiently larger on channels that can support the data rate being attempted (i.e. They have a sufficiently high information theoretic channel capacity assuming the specified transmit power spectrum.)

Clearly, as many elements of the periodic distance vector as possible should be nonzero. To that end, the periodic effective code length (PECL) of a convolutional code is defined as the smallest number of nonzero elements in a periodic distance vector between any pair of valid code sequences. For example, suppose a code can generate exactly 3 valid sequences, sequence a, sequence b, and sequence c, then there are three possible pairs of valid sequences (ab, ac, and bc). Suppose the periodic distance vector between sequences a and c has 7 nonzero elements, the periodic distance vector between sequences a and b has 6 nonzero elements, and the periodic distance vector between sequences b and c has 5 nonzero elements. For this example, the PECL is 5. Note that a code typically generates a very large number of sequences.

A code is desired that performs well for all sets of channels with capacity greater than or equal to C. That is, all channels which have $$\sum_{k=1}^{N} \log_2\left(1 + \frac{a_k^2 E[x_k^2]}{\sigma^2}\right) \geq C \qquad \text{equ. (4)}$$

where N is the number of subchannels. For any particular periodic distance vector, there is a particular one of these channels which gives the smallest sum of the weighted distance vector elements. The problem of finding the sum of the weighted distance vector elements produced by the particular channel which makes that sum smallest can be approximated by a constrained minimization problem. Without loss of generality, fix the value of $E[x_k^2]/\sigma^2$ to be one. Neglecting the one in the formula for capacity in equation 4 above, the problem then can be formally stated as "Minimize $$\sum_{k=1}^{P} a_k^2 \tilde{d}_k^2$$

over all sets of subchannel gains such that $$\sum_{k=1}^{P} \log_2(a_k^2) >= C.$$

" Using Lagrange multipliers, a technique well known in the art, the solution to this problem is $$P \cdot \left( e^c \prod_{k=1}^{P} \tilde{d}_k^2 \right)^{1/P} \qquad \text{equ. (5)}$$

The resulting minimum sum, the smallest sum of the weighted distance vector elements, is thus monotonic in $$\prod_{k=1}^{P} \tilde{d}_k^2,$$

which is defined as the periodic product distance (PPD).

Note that PPD is zero for periodic distance vectors which have one or more zero elements. However, the subchannel gains which cause this to happen are unrealistic being zero for all the nonzero periodic distance vector elements and very large for the few periodic distance vector elements that are zero. To get a meaningful result for these situations, the minimization above is carried out over only the nonzero elements of the periodic distance vector. The periodic product distance of order i, (PPD(i)), of a convolutional code is defined to be the smallest product of the elements of a periodic distance vector for that code having i nonzero elements, which will be calculated for values of i from PECL to P as explained below.

Another way to see the value of the periodic product distance is to realize that to maximize the product of P numbers which have a fixed sum, the P numbers should all be set to the same value (the fixed sum divided by P). Thus having the product distance as a metric simply means that codes which spread distance evenly over the periodic distance vector are most desirable. Since it is not known which subchannel gains will be high or low, an even distribution of distance is certainly desirable.

Code Design Procedure

Figure 7:
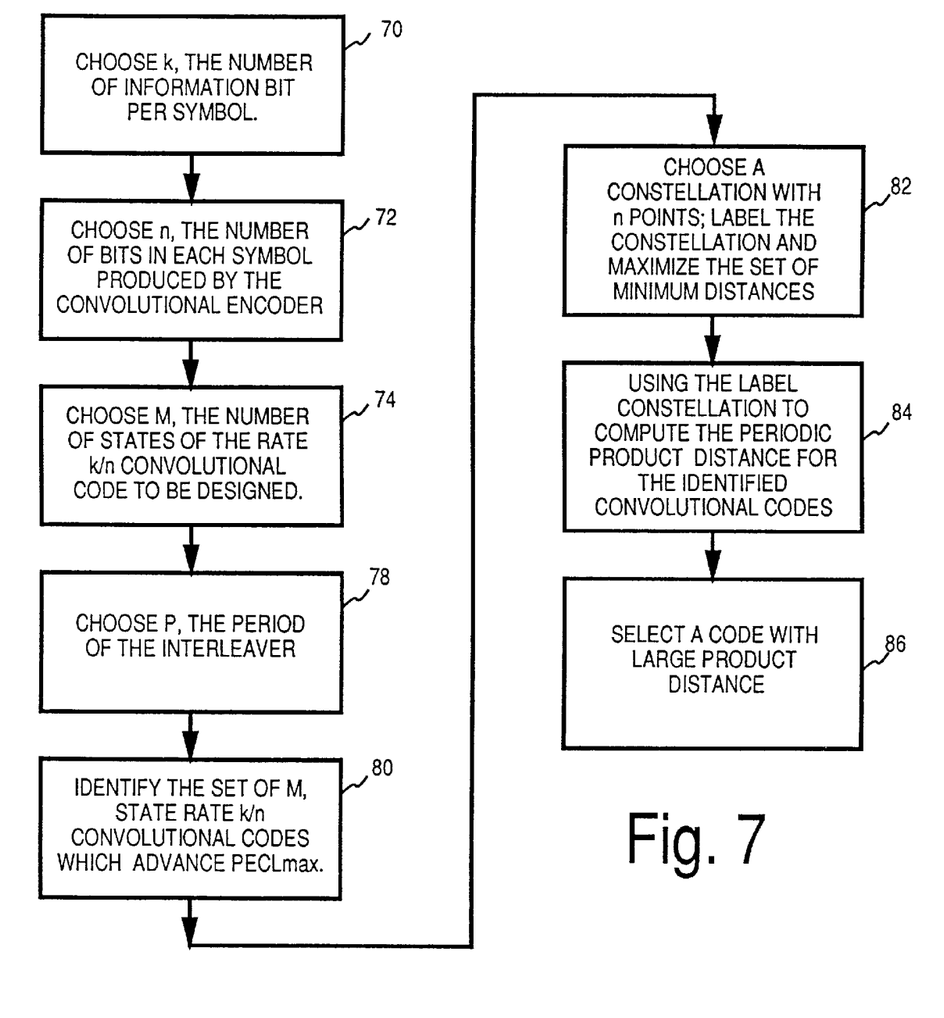
FIG. 7 is a flow chart showing the steps in designing a code to be used in a transmission system of the present invention.

Referring to FIG. 7, a sequence of steps is followed to generate the convolutional codes for use in the transmission systems of the present invention. First, the number of information bits per symbol, k, is selected 70. This is also the desired transmission rate divided by the symbol rate. Next, the number of bits, n>=k, in each output symbol from the convolutional encoder is selected 72. In general, this number should be as large as possible given the digital-to-analog and analog-to-digital precision available. However, if it is known that the highest SNR subchannels have an information theoretic capacity of only t bits, n need not be larger than t+1. Next, the number of states, M, of the rate k/n convolutional code to be designed is selected 74. Recall that a larger number of states allows better performance but at the cost of higher complexity.

Having selected k, n, and M, the interleaving period P can now be chosen 78. P should be chosen to maximize the achievable PECL while meeting two constraints. The first constraint is that the interleaving period P must be a factor of the number of subcarriers, and the second constraint is that the interleaving period P should not be so large that two subchannel gains in the same period will be too close in frequency. Two bounds on PECL are useful here. First, a code with M states must have PECL<=$\log_2$(M)+1. Second, a rate k/n code must have PECL<=((n−k)/n)*P+1. The interleaving period P should initially be chosen as the smallest factor of the number of subcarriers which makes the second bound (which depends on P) greater than or equal to the first bound (which does not depend on P). Typically, a code is then found which achieves the smaller of the two bounds. If such a code is not found, then other values of P may need to be investigated to find the smallest value of P which maximizes the achievable PECL.

For example, with M=64 the first bound is equal to 7. With 512 subcarriers the possible values of P (factors of 512) are 1, 2, 4, 8, etc. With a rate ¼ code, the values of the second bound corresponding to these values of P are 1.75, 2.5, 4, 7, etc. The first value of P for which the second bound is 7 and thus equal to the first bound is P equals to 8. There are many 64 state rate ¼ convolutional codes which have PECL=7 for P equals to 8.

Now, identify the set of M state rate k/n convolutional codes that achieve the maximum possible PECL (usually the minimum of the two bounds) 80. A $2^n$ point constellation is selected next and the constellation is labeled in a manner such that the minimum distances associated with error patterns are as large as possible 82. Using the labeled constellation, the periodic product distances for orders PECL through P for each of the convolutional codes identified above are computed 84. Finally, a code that has large periodic product distances for orders PECL through P is selected 86.

The algorithm proposed by Lapidoth in his article, Amos Lapidoth, *The Performance of Convolutional Codes on the Block Erasure Channel Using Various Finite Interleaving Techniques*, IEEE Transactions on Info. Theory, 40(5) :1459–1473, September 1994, for computing the bit error rate of convolutional codes using periodic interleaving can easily be adapted by those skilled in the art to obtain an efficient algorithm for computing the PECL of a convolutional code. The periodic product distances can be obtained by direct trellis search, a technique well known in the art.

For illustration, the above example with P=8 and a 64-state, rate ¼ convolutional code is used to show how a code is selected. The set of codes having PECL=7 are identified. A 16 QAM constellation is labeled according to the well known gray-coding procedure because this allows the largest minimum distances possible to be associated with the 16 possible error patterns.

Ideally, for codes having maximum PECL (PECL=7), both log PPD(7) and log PPD(8) should be as large as possible. However the code with the largest value of log PPD(7) is not the same as the code with the largest value of log PPD(8). An initial compromise between these two competing design goals is to maximize the sum, which is an example of a linear combination, of log PPD(7) and log PPD(8). However, ultimately, a code which does not maximize the sum may be chosen if the code which maximize the sum has an undesirably low value of either log PPD(7) or log PPD(8).

Figure 8:
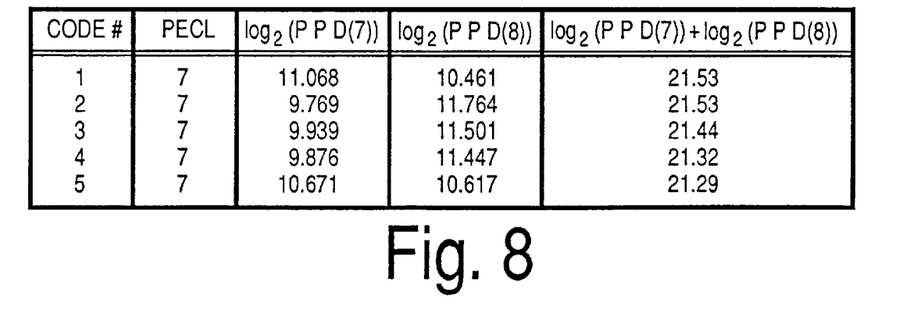
FIG. 8 is a table illustrating the PECL and PPD from 5 codes.

The codes with PECL=7 are thus ordered according to the sum of the base 2 logs of the PPD(7) and PPD(8). Since PECL=7, these codes have no distance vectors with fewer than 7 nonzero elements. The five codes with the largest values for this sum are listed in FIG. 8 along with the base 2 logs of PPD(7) and PPD(8). All of these codes have PECL of 7. Codes #2–#5 would be rejected because of their relatively small values of PPD(7). Thus Code #1 would be selected and implemented in the preferred embodiment of the present invention in this particular example. Note that the first code on this sorted list may be rejected for a code lower on the list if the first code has a significantly smaller PPD(i) value compared to the code lower on the list.

Figure 9:
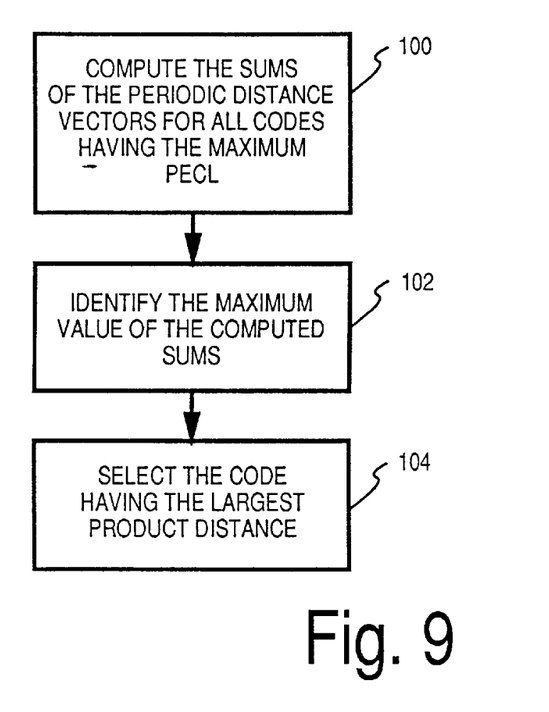
FIG. 9 is a flow chart showing alternative steps to the last two steps in the flow chart of FIG. 7.

An alternative design procedure which may be appropriate in certain circumstances replaces boxes 84 and 86 of FIG. 7 with the three steps shown in FIG. 9. Referring to FIG. 9, the sum of the periodic distance vector is computed for all codes having the maximum PECL 100. Then those codes having the maximum values of this sum are identified 102. From among those codes, the code with the largest periodic product distances is then chosen 104.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A transmission system for providing information through a transmission medium to at least one receiver over at least one channel, comprising:

encoding means including, an encoder using a code having maximum periodic effective code length and maximum periodic product distance for encoding input data symbols to generate encoded symbols, wherein code used by said encoder is determined by:

a) choosing k, the number of information bits in said input symbol;

b) choosing n, the number of bits in said encoded symbol produced by said encoder;

c) choosing M, the number of states of said code;

d) choosing P, the period of an interleaver;

e) determining maximum possible PECL, periodic effective code length, as a function of the number of information bits in said input symbol, the number of bits in said encoded symbol, and the number of states of said code;

f) identifying a set of codes having said maximum possible periodic effective code length;

g) labeling a constellation with $2^2$ points to maximize minimum distances associated with error patterns;

h) for each code in said identified set of codes, using the labeled constellation to compute periodic product distances of orders PECL to P, and a linear combination of a montonic function of said periodic product distances; and i) selecting from said set of codes a code having a relatively large value of said linear combination and a relatively large periodic product distances at each order from PECL to P, a signal mapper for mapping each said encoded symbol to an n-bit constellation signal point, and said interleaver for interleaving a plurality of the constellation signal points to generate interleaved constellation signal points;

a modulator for modulating the interleaved constellation signal points; and a transmitter for transmitting the modulated signal points over said transmission medium.

2. A transmission system as recited in claim 1 wherein said code used by said encoder is determined by:

a) choosing k, the number of information bits in said input symbol;

b) choosing n, the number of bits in said encoded symbol produced by said encoder;

c) choosing M, the number of states of said code;

d) choosing P, the period of said interleaver;

e) determining maximum possible PECL, periodic effective code length, as a function of the number of information bits in said input symbol, the number of bits in said encoded symbol, and the number of states of said code;

f) identifying a set of codes having said periodic effective code length;

g) labeling a constellation with $2^n$ points to maximize minimum distances associated with error patterns;

h) for each code in said identified set of codes, using the labeled constellation to compute periodic distance vectors each having a number of elements and summing the elements for each of said periodic distance vectors;

i) identifying one or more minimum sums from said summed elements;

j) from said set of identified codes, selecting a subset of codes for which the minimum sums are above a predefined threshold; and k) from said subset of codes, selecting a code having a relatively large value of periodic product distances at each order from PECL to P.

3. A transmission system as recited in claim 1 wherein said n-bit constellation is used in generating a number of output bits, n, which is greater than the number of bits in said input symbol plus one.

4. A transmission system as recited in claim 1 wherein said code is used in a multicarrier modulation system having a plurality of subcarriers, and wherein interleaving is performed in frequency among the subcarriers of said multicarrier modulation system.

5. A transmission system as recited in claim 1 wherein said code is used in a frequency hopping modulation scheme with an appropriate hopping pattern.

6. A transmission system as recited in claim 1 wherein said code is used in a flat fading scenario by performing periodic interleaving in time.

7. A transmission system as recited in claim 1 wherein said code is used in a system employing multicarrier modulation and frequency hopping modulation and wherein interleaving is performed in both time and frequency.

8. A transmission system for providing broadcast information through a transmission medium to at least one receiver over at least one channel, comprising:

encoding means including, an encoder using a code having maximum periodic effective code length and maximum periodic product distance for encoding input data symbols to generate encoded symbols, wherein said code used by said encoder is determined by:

a) choosing k, the number of information bits in said input symbol;

b) choosing n, the number of bits in said encoded symbol produced by said encoder;

c) choosing M, the number of states of said code;

d) choosing P, the period of an interleaver;

e) determining maximum possible PECL, periodic effective code length, as a function of the number of information bits in said input symbol, the number of bits in said encoded symbol, and the number of states of said code;

f) identifying a set of codes having, said maximum possible periodic effective code length;

g) labeling a constellation with $2^n$ points to maximize minimum distances associated with error patterns;

h) for each code in said identified set of codes, using the labeled constellation to compute periodic product distances of orders PECL to P, and a linear combination of a montonic function of said periodic product distances; and i) selecting from said set of codes a code having a relatively large value of said linear combination and a relatively large periodic product distances at each order from PECL to P, an interleaver for interleaving a plurality of the encoded symbols to generate interleaved encoded symbols, and a signal mapper for mapping each of the interleaved encoded symbols to an n-bit constellation signal point;

a modulator for modulating the constellation signal points; and a transmitter for transmitting the modulated signal points over said transmission medium.

9. A transmission system as recited in claim 8 wherein said code used by said encoder is determined by:

a) choosing k, the number of information bits in said input symbol;

b) choosing n, the number of bits in said encoded symbol produced by said encoder;

c) choosing M, the number of states of said code;

d) choosing P, the period of said interleaver;

e) determining maximum possible PECL, periodic effective code length, as a function of the number of information bits in said input symbol, the number of bits in said encoded symbol, and the number of states of said code;

f) identifying a set of codes having said periodic effective code length;

g) labeling a constellation with $2^n$ points to maximize minimum distances associated with error patterns;

h) for each code in said identified set of codes, using the labeled constellation to compute periodic distance vectors each having a number of elements and summing the elements for each of said periodic distance vectors;

i) identifying one or more minimum sums from said summed elements;

j) from said set of identified codes, selecting a subset of codes for which the minimum sums are above a predefined threshold; and k) from said subset of codes, selecting a code having a relatively large value of periodic product distances at each order from PECL to P.

10. A transmission system as recited in claim 8 wherein said n-bit constellation is used in generating a number of output bits, n, which is greater than the number of bits in said input symbol plus one.

11. A transmission system as recited in claim 8 wherein said code is used in a multicarrier modulation system having a plurality of subcarriers, and wherein interleaving is performed in frequency among the subcarriers of said multicarrier modulation system.

12. A transmission system as recited in claim 8 wherein said code is used in a frequency hopping modulation scheme with an appropriate hopping pattern.

13. A transmission system as recited in claim 8 wherein said code is used in a flat fading scenario by performing periodic interleaving in time.

14. A transmission system as recited in claim 8 wherein said code is used in a system employing multicarrier modulation and frequency hopping modulation and wherein interleaving is performed in both time and frequency.

15. A method for encoding input symbols to generate interleaved encoded signal points for modulation and transmission through a medium, comprising the steps of:

encoding an input symbol to generate an encoded symbol by using a convolution code having maximum periodic effective code length and maximum periodic product distance, wherein said convolutional code is determined by:

a) choosing k, the number of information bits in said input symbol;

b) choosing n, the number of bits in said encoded symbol;

c) choosing M, the number of states of said code;

d) choosing P, the period of an interleaver;

e) determining maximum possible PECL, periodic effective code length, as a function of the number of information bits in said input symbol, the number of bits in said encoded symbol, and the number of states of said code;

f) identifying a set of codes having said maximum possible periodic effective code length;

g) labeling a constellation with $2^n$ points to maximize minimum distances associated with error patterns;

h) for each code in said identified set of codes, using the labeled constellation to compute periodic product distances of orders PECL to P, and a linear combination of a montonic function of said periodic product distances; and i) selecting from said set of codes a code having a relatively large value of said linear combination and a relatively large periodic product distances at each order from PECL to P;

mapping said encoded symbol to a constellation signal point in a defined constellation; and interleaving a plurality of the constellation signal points to produce interleaved encoded signal points.

16. A method as recited in claim 15 wherein said convolutional code is determined by:

a) choosing k, the number of information bits in said input symbol;

b) choosing n, the number of bits in said encoded symbol produced by said encoder;

c) choosing M, the number of states of said code;

d) choosing P, the period of said interleaver;

e) determining maximum possible PECL, periodic effective code length, as a function of the number of information bits in said input symbol, the number of bits in said encoded symbol, and the number of states of said code;

f) identifying a set of codes having said periodic effective code length;

g) labeling a constellation with $2^n$ points to maximize minimum distances associated with error patterns;

h) for each code in said identified set of codes, using the labeled constellation to compute periodic distance vectors each having a number of elements and summing the elements for each of said periodic distance vectors;

i) identifying one or more minimum sums from said summed elements;

j) from said set of identified codes, selecting a subset of codes for which the minimum sums are above a predefined threshold; and k) from said subset of codes, selecting a code having a relatively large value of periodic product distances at each order from PECL to P.

17. A method as recited in claim 15 wherein said n-bit constellation is used in generating a number of output bits, n, which is greater than the number of bits in said input symbol plus one.

18. A method as recited in claim 15 wherein said code is used in a multicarrier modulation system having a plurality of subcarriers, and wherein interleaving is performed in frequency among the subcarriers of said multicarrier modulation system.

19. A method as recited in claim 15 wherein said code is used in a frequency hopping modulation scheme with an appropriate hopping pattern.

20. A method as recited in claim 15 wherein said code is used in a flat fading scenario by performing periodic interleaving in time.

21. A method as recited in claim 15 wherein said code is used in a system employing multicarrier modulation and frequency hopping modulation and wherein interleaving is performed in both time and frequency.

22. A method for encoding input symbols to generate constellation signal point for modulation and transmission through a medium, comprising the steps of:

encoding an input symbol to generate an encoded symbol by using a convolutional code having maximum periodic effective code length and maximum periodic product distance, wherein said convolutional code is determined by:

a) choosing k, the number of information bits in said input symbol;

b) choosing n, the number of bits in said encoded symbol;

c) choosing M, the number of states of said code;

d) choosing P, the period of an interleaver;

e) determining maximum possible PECL, periodic effective code length, as a function of the number of information bits in said input symbol, the number of bits in said encoded symbol, and the number of states of said code;

f) identifying a set of codes having said maximum possible periodic effective code length;

g) labeling a constellation with $2^n$ points to maximize minimum distances associated with error patterns;

h) for each code in said identified set of codes, using the labeled constellation to compute periodic product distances of orders PECL to P, and a linear combination of a montonic function of said periodic product distances; and i) selecting from said set of codes a code having a relatively large value of said linear combination and a relatively large periodic product distances at each order from PECL to P;

interleaving a plurality of the encoded symbols to product interleaved encoded symbols; and mapping each of the interleaved encoded symbols to a corresponding constellation signal point in a defined constellation.

23. A method as recited in claim 22 wherein said convolutional code is determined by:

a) choosing k, the number of information bits in said input symbol;

b) choosing n, the number of bits in said encoded symbol produced by said encoder;

c) choosing M, the number of states of said code;

d) choosing P, the period of said interleaver;

e) determining maximum possible PECL, periodic effective code length, as a function of the number of information bits in said input symbol, the number of bits in said encoded symbol, and the number of states of said code;

f) identifying a set of codes having said periodic effective code length;

g) labeling a constellation with $2^n$ points to maximize minimum distances associated with error patterns;

h) for each code in said identified set of codes, using the labeled constellation to compute periodic distance vectors each having a number of elements and summing the elements for each of said periodic distance vectors;

i) identifying one or more minimum sums from said summed elements;

j) from said set of identified codes, selecting a subset of codes for which the minimum sums are above a predefined threshold; and k) from said subset of codes, selecting a code having a relatively large value of periodic product distances at each order from PECL to P.

24. A method as recited in claim 22 wherein said n-bit constellation is used in generating a number of output bits, n, which is greater than the number of bits in said input symbol plus one.

25. A method as recited in claim 22 wherein said code is used in a multicarrier modulation system having a plurality of subcarriers, and wherein interleaving is performed in frequency among the subcarriers of said multicarrier modulation system.

26. A method as recited in claim 22 wherein said code is used in a frequency hopping modulation scheme with an appropriate hopping pattern.

27. A method as recited in claim 22 wherein said code is used in a flat fading scenario by performing periodic interleaving in time.

28. A method as recited in claim 22 wherein said code is used in a system employing multicarrier modulation and frequency hopping modulation and wherein interleaving is performed in both time and frequency.

29. A method for determining an optimal code for encoding input symbols to generate encoded symbols for use in a transmission system, comprising the steps of:

a) choosing k, the number of information bits in an input symbol;

b) choosing n, the number of bits in an encoded symbol produced by an encoder;

c) choosing M, the number of states of a code;

d) choosing P, the period of an interleaver;

e) determining maximum possible PECL, periodic effective code length, as a function of the number of information bits in said input symbol, the number of bits in said encoded symbol, and the number of states of said code;

f) identifying a set of codes having said maximum possible periodic effective code length;

g) labeling a constellation with $2^n$ points to maximize minimum distances associated with error patterns;

h) for each code in said identified set of codes, using the labeled constellation to compute periodic product distances of orders PECL to P, and a linear combination of a monotonic function of said periodic product distances; and i) selecting from said set of codes a code having a relatively large value of said linear combination and a relatively large periodic product distances at each order from PECL to P.

30. A method for determining an optimal code for encoding input symbols to generate encoded symbols for use in a transmission system, comprising the steps of:

a) choosing k, the number of information bits in an input symbol;

b) choosing n, the number of bits in an encoded symbol produced by an encoder;

c) choosing M, the number of states of a code;

d) choosing P, the period of an interleaver;

e) determining maximum possible PECL, periodic effective code length, as a function of the number of information bits in said input symbol, the number of bits in said encoded symbol, and the number of states of said code;

f) identifying a set of codes having said periodic effective code length;

g) labeling a constellation with $2^n$ points to maximize minimum distances associated with error patterns;

h) for each code in said identified set of codes, using the labeled constellation to compute periodic distance vectors each having a number of elements and summing the elements for each of said periodic distance vectors;

i) identifying one or more minimum sums from said summed elements;

j) from said set of identified codes, selecting a subset of codes for which the minimum sums are above a predefined threshold; and k) from said subset of codes, selecting a code having a relatively large value of periodic product distances at each order from PECL to P.

* * * * *